US012280985B2

(12) United States Patent
Lo Jacono et al.

(10) Patent No.: US 12,280,985 B2
(45) Date of Patent: Apr. 22, 2025

(54) DRIVE SYSTEM FOR AN ELEVATOR INSTALLATION, ELEVATOR INSTALLATION, AND METHOD FOR INSTALLING A DRIVE ON A SUPPORT ELEMENT OF AN ELEVATOR INSTALLATION

(71) Applicant: Inventio AG, Hergiswil (CH)

(72) Inventors: Romeo Lo Jacono, Gravesano (CH); Alessandro D'Apice, Adligenswil (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/560,419

(22) PCT Filed: May 19, 2022

(86) PCT No.: PCT/EP2022/063496
§ 371 (c)(1),
(2) Date: Nov. 13, 2023

(87) PCT Pub. No.: WO2022/243398
PCT Pub. Date: Nov. 24, 2022

(65) Prior Publication Data

US 2024/0253947 A1 Aug. 1, 2024

(30) Foreign Application Priority Data

May 19, 2021 (EP) .................................... 21174726

(51) Int. Cl.

| | |
|---|---|
| ***B66B 11/00*** | (2006.01) |
| ***B66B 9/00*** | (2006.01) |
| ***B66B 11/04*** | (2006.01) |
| ***B66B 19/00*** | (2006.01) |

(52) U.S. Cl.
CPC ............ *B66B 11/0045* (2013.01); *B66B 9/00* (2013.01); *B66B 11/043* (2013.01); *B66B 19/005* (2013.01)

(58) Field of Classification Search
CPC ... B66B 11/026; B66B 11/043; B66B 11/008; B66B 11/0045
See application file for complete search history.

(56) References Cited

U.S. PATENT DOCUMENTS

| | | | | |
|---|---|---|---|---|
| 5,957,242 | A | 9/1999 | Suter et al. | |
| 6,006,865 | A | 12/1999 | Ammon | |
| 2011/0132695 | A1* | 6/2011 | Aziz .................. | B66B 11/0045 187/266 |
| 2017/0225926 | A1 | 8/2017 | Watanabe | |

FOREIGN PATENT DOCUMENTS

| | | | | |
|---|---|---|---|---|
| CA | 2506380 | A1 * | 11/2005 | ........... B66B 19/005 |
| EP | 2493803 | B1 * | 1/2018 | ......... B66B 11/0035 |
| JP | 11314870 | A * | 11/1999 | |
| WO | 2021070362 | A1 | 4/2021 | |
| WO | 2021122814 | A1 | 6/2021 | |

* cited by examiner

*Primary Examiner* — Diem M Tran
(74) *Attorney, Agent, or Firm* — Shumaker, Loop & Kendrick, LLP

(57) ABSTRACT

A drive system for an elevator installation includes a drive and a drive suspension for fastening the drive to a support element of the elevator installation. The drive suspension has a rotary joint for tiltably mounting the drive on the support element and an adjustment device for setting a tilt of the drive about the rotary joint.

13 Claims, 5 Drawing Sheets

DRIVE SYSTEM FOR AN ELEVATOR INSTALLATION, ELEVATOR INSTALLATION, AND METHOD FOR INSTALLING A DRIVE ON A SUPPORT ELEMENT OF AN ELEVATOR INSTALLATION

FIELD

The invention relates to a drive system for an elevator installation, an elevator installation, and a method for installing a drive on a support element of an elevator installation.

BACKGROUND

Known elevator installations for transporting people or loads include an elevator car which can be moved vertically in an elevator shaft. The elevator car is usually connected to a counterweight via a carrier means. A drive for moving the elevator car along a guide rail can be arranged, for example, on a drive assembly in a shaft head of the elevator shaft or in a machinery room above the elevator shaft. However, previously known drive systems for elevator installations require a lot of space, for example in the shaft head of an elevator installation, or they are complex to install.

SUMMARY

An object of the invention is to specify a drive system for an elevator installation and in particular an elevator installation which is improved compared to drive systems or elevator installations known from the prior art, with the space requirement of the drive system being reduced or the assembly of the drive system being simplified. Another object of the invention is to specify a method for installing a drive of an elevator installation.

The objects are achieved with a drive system and a method according to the advantageous developments and embodiments found in this description.

One aspect of the invention relates to a drive system for an elevator installation, comprising a drive and a drive suspension for fastening the drive to a support element of the elevator installation, wherein the drive suspension comprises: a rotary joint via which the drive can be fastened to the support element and which is designed for tiltably mounting the drive on the support element; and an adjustment device for setting the tilt of the drive about the rotary joint.

A further aspect of the invention relates to an elevator installation comprising a drive system according to any of the embodiments described herein, an elevator car, and a counterweight which is connected to the elevator car via a carrier means, the drive being designed to drive the carrier means.

Yet another aspect of the invention relates to a method for installing a drive on a support element of an elevator installation, comprising mounting the drive on the support element by means of a rotary joint, stabilizing the drive with respect to the support element, and setting a tilt of the drive about the rotary joint.

In preferred embodiments, the drive includes a motor, in particular a motor and a gear. However, the drive can be gearless. The drive has a drive shaft. The drive shaft is rotatable about a shaft axis of the drive. A friction drive pulley of the drive can be fastened to the drive shaft. The friction drive pulley is designed to provide contact between a carrier means of an elevator installation and the drive. In particular, the friction drive pulley is designed to transmit a force provided by the drive to the carrier means. The drive suspension is preferably designed such that, when the drive is fastened to the support element, the friction drive pulley is arranged between the motor of the drive and the support element.

Preferably, the drive system is designed such that, in the installed state, it comprises a substantially horizontally extending shaft or shaft axis having a friction drive pulley formed in the shaft.

Preferably, the rotary joint is arranged above the substantially horizontally extending shaft axis, wherein the adjusting device is arranged below the shaft axis.

The drive system preferably includes a guide rail for guiding an elevator car, with the guide rail forming the support element. In further preferred embodiments, the support element can be a shaft wall of an elevator installation or a carrying structure in an elevator shaft of an elevator installation.

In preferred embodiments, the rotary joint of the drive suspension should be understood to be a rotatable connection between the drive and the support element. An axis of rotation of the rotary joint is preferably at least substantially perpendicular to a shaft axis of the drive. "At least substantially perpendicular" should be understood here in particular to mean a perpendicular orientation or an orientation deviating from a perpendicular orientation by a maximum of 15°, for example by a maximum of 10° or by a maximum of 5°. In embodiments, the axis of rotation can be aligned at least substantially perpendicularly to the shaft axis of the drive and perpendicularly to a longitudinal axis of a guide rail. The shaft axis of the drive can be aligned at least substantially perpendicularly to the axis of rotation of the rotary joint and at least substantially perpendicularly to a vertical direction, for example perpendicularly to the longitudinal axis of a guide rail. In preferred embodiments, the shaft axis of the drive is aligned with the guide rail.

The adjustment device is preferably arranged below the rotary joint. The rotary joint is designed in particular to transfer a tensile load from the drive to the support element. The adjustment device is designed, for example, to transfer a compressive load from the drive to the support element. In embodiments, the rotary joint is arranged above a friction drive pulley of the drive and the adjustment device is arranged below the friction drive pulley. In particular, the friction drive pulley is arranged between the rotary joint and the adjustment device. In further embodiments, the adjustment device is arranged around the friction drive pulley. For example, the adjustment device can extend in the form of a cage around the friction drive pulley in the direction of the support element, with the adjustment device having at least one window for a carrier means to pass through. In preferred embodiments, the friction drive pulley has a friction drive pulley diameter of at most 150 mm, in particular at most 100 mm, or at most 70 mm.

In preferred embodiments, the rotary joint of the drive suspension comprises a fixing part, which is designed for fastening to the support element, and a first suspension part, which is fastened to the drive. The fixing part and the first suspension part are rotatably connected to one another about an axis of rotation. The fixing part is preferably rigidly connected to the support element and the first suspension part is rigidly connected to the drive. Rigid connections can be provided by joining methods, for example by screwing.

Preferably, the fixing part is designed such that it has at least one arc-like edge, wherein the arc-like edge runs directly above a friction drive pulley in the installed state.

The arc-like edge has the advantage that the forces acting on the edge (due to the weight of the drive and the cabin, which in the installed state is suspended from the friction drive pulley via a support means) are distributed uniformly over the edge. In comparison with a less advantageous rectangular design, a force concentration can thus be prevented at the intersection of the edges extending at right angles to one another. Furthermore, by arranging the arc-like edge directly above the friction drive pulley, a kind of arc-like span can be formed, which extends in an arc-like manner from one radial end of the friction drive pulley towards the other end of the friction drive pulley. Thus, the distance between the arc-like edge and the traction surface of the friction drive pulley increases, at least initially, from one radial end to the other radial end. Thus, the arc-like edge forms a lateral boundary which begins at the radial end of the friction drive pulley directly above the traction surface. Lateral movement of the support means is thus prevented by the edge. This prevents the carrier means from jumping without additional edges on the friction drive pulley provided for this purpose.

Preferably, the fixing part and the support element are designed such that the fixing part can be inserted partially into the support element and can be fastened to the support element in an end position of the inserted state.

As a result, the drive and the drive suspension can already be supplied as a pre-installed drive/drive suspension unit and can be easily inserted in the field into an opening provided for this purpose in the support element and fastened in an end position of the inserted state. The comparatively complex installation of the drive/drive suspension unit can thus be separated from installation in the field. In this way, in particular, it is not necessary for the rotary joint which is comparatively complex to install to be installed in the field. The functionality of the fine adjustment of the orientation of the friction drive pulley can thus be combined with easy installation of the drive (and the drive suspension) in the field.

In preferred embodiments, the first suspension part has at least one first opening and the fixing part has at least one second opening. The rotary joint comprises a connecting element guided through the at least one first opening and the at least one second opening. The connecting element can be a pin, a bolt, or a screw, for example. In particular, the connecting element is arranged along the axis of rotation of the rotary joint.

In a preferred embodiment, the axis of rotation is arranged exactly above the center of the friction drive pulley, so that an automatic alignment of the friction drive pulley results when the weight of the drive is disregarded.

In preferred embodiments, the rotary joint is designed as a hinge. In embodiments, the first suspension part has at least one first opening along the axis of rotation of the rotary joint. The fixing part has at least two second openings along the axis of rotation of the rotary joint. The first suspension part extends between the at least two second openings of the fixing part, with the at least one first opening of the first suspension part being arranged between two second openings of the fixing part.

In preferred embodiments, the rotary joint is designed to support torques or torque components in directions perpendicular to the axis of rotation. In particular, the rotary joint is designed to support torques or torque components in the direction of the shaft axis of the drive or in the direction of the longitudinal axis of a guide rail. The fixing part and the first suspension part can be in contact along the axis of rotation via at least two contact surfaces, with the contact surfaces extending around the axis of rotation, in particular around the axis of rotation and perpendicular to the axis of rotation. In particular, the fixing part and the first suspension part can form a torque support. For example, the rotary joint can at least partially support torques or torque components that result from the driving of a carrier means or the movement of an elevator car or a counterweight.

Preferably, the adjustment device of the drive suspension comprises a fixing part, which is designed for fastening to the support element, and a second suspension part, which is fastened to the drive and connected to the fixing part. The fixing part and the second suspension part are displaceable relative to one another in a settable manner. The adjustment device can be designed in particular as a linear adjustment device. The adjustment device can comprise an adjustment screw, the adjustment device being designed to displace the fixing part and the second suspension part relative to one another, in particular to move them linearly relative to one another, by rotating the adjustment screw. The second suspension part is preferably rigidly connected to the drive and the fixing part is rigidly connected to the support element.

In preferred embodiments, the tilt of the drive about the rotary joint can be set by displacing the second suspension part relative to the fixing part. For example, the tilt can be set by rotating an adjustment screw of the adjustment device, the second suspension part being displaced relative to the fixing part by rotating the adjustment screw. In particular, the drive suspension is designed to tilt the drive about the axis of rotation of the rotary joint with respect to the support element, for example with respect to a guide rail, by means of the displacement. In particular, a maximum tilt of 20°, for example a maximum of 10° or a maximum of 5°, can be set by the displacement. In embodiments, the fixing part is part of the rotary joint and the adjustment device.

The drive suspension preferably comprises at least one first isolation element, in particular a mechanical isolation element or a buffer element, wherein the at least first isolation element is configured to reduce or prevent the transmission of vibrations or structure-borne noise from the drive to the support element, wherein the first isolation element is preferably attached to the rotary joint, wherein the drive suspension preferably has a second isolation element, wherein the second isolation element is preferably attached to the adjustment device. The isolation element(s) is/are preferably a spring-damping element. The drive can be decoupled from the support element with regard to the propagation of vibrations or structure-borne noise by means of the isolation elements. In particular, the isolation elements are designed to damp vibrations or structure-borne noise between the drive and the support element. The isolation elements can be arranged between a first suspension part and a fixing part or between a second suspension part and a fixing part. A connecting means, which is arranged so as to pass through at least one first opening of the first suspension part and at least one second opening of the fixing part, is preferably at least partially encased by the first isolation element. In particular, the connecting means is surrounded by the isolation element in the region of the at least one first opening, for example in the region of the at least one first opening and the at least one second opening. In embodiments, the at least one isolation element comprises plastic or rubber material. The at least one isolation element can offer the advantage that structure-borne noise is prevented from spreading to a building in which an elevator installation comprising a drive system according to the embodiments described herein is installed.

In preferred embodiments, the drive suspension, in particular the first suspension part or the second suspension part, comprises an adapter plate which is designed for fastening the drive suspension to a suspension-side end of the drive. The adapter plate is rigidly connected, for example screwed, to the drive. The adapter plate can have a shaft opening for a drive shaft of the drive to pass through. In embodiments, the adapter plate is manufactured as a separate component. In further embodiments, the adapter plate is manufactured as part of the first suspension part or as part of the second suspension part. In particular, the first suspension part and the second suspension part, including the adapter plate, can be manufactured in one piece.

According to embodiments, an elevator installation comprises a drive system according to any of the embodiments described herein. The elevator installation comprises an elevator car. The elevator car is designed to be moved along a guide rail. The elevator installation comprises a counterweight, which is connected to the elevator car via a carrier means. The guide rail is preferably arranged between the elevator car and the counterweight. The drive is designed to drive the carrier means. As a result of the carrier means being driven, the elevator car and the counterweight can be moved vertically, for example in opposite vertical directions. Directional statements regarding "upward", "downward", "horizontally", or "vertically" should be understood here in particular in relation to the direction of gravitational force.

In preferred embodiments, the drive is arranged in an upper end region of the elevator installation. An upper end region of the elevator installation should be understood, for example, to mean a vertical region of the elevator installation, the vertical region corresponding to the upper 30%, in particular the upper 20% or the upper 10%, of the height of the elevator installation. For example, the drive can be arranged in a low shaft head. In particular, the elevator installation can be designed without a machinery room.

The carrier means preferably comprises a belt. For example, a belt may be made of sheathed cords, such as sheathed steel cables. In cross section, the belt has a width which is greater than a thickness of the belt. For example, setting a tilt of the drive relative to the support element can prevent or reduce skewing of the belt or uneven loading of the belt. In particular, the tilt can be readjusted over the lifetime of the elevator installation. In further embodiments, the carrier means comprises at least one cable, for example at least one steel cable.

In elevator installations according to preferred embodiments, the elevator car has a drive-side side wall that faces the drive system, and a shaft axis of the drive runs at least substantially parallel to the drive-side side wall. "At least substantially parallel" should be understood here in particular to mean a parallel alignment or an alignment deviating from a parallel alignment by a maximum of 20°, for example by a maximum of 10° or by a maximum of 5°. In particular, a friction drive pulley of the drive can be arranged between the counterweight and the elevator car in a plan view of the elevator installation.

Preferred embodiments include at least one further drive system. In particular, elevator installations include at least one further drive system according to the embodiments described herein. The drive system and the at least one further drive system can be arranged on opposite sides of the elevator car. The at least one further drive system preferably drives a further carrier means which is connected to the elevator car and in particular to a further counterweight. The use of at least two drive systems can offer the advantage that smaller or lighter drives can be used. In particular, the space requirement of a drive system can be reduced. For example, in a plan view of the elevator installation, a drive can be arranged between the elevator car and a shaft wall or a counterweight.

Preferred embodiments of the method for installation comprise pre-installation of the drive and the drive suspension to form a drive suspension unit. This is done by fastening a first suspension part of a drive suspension to the drive and fastening a fixing part to the first suspension part. It therefore comprises connecting the first suspension part to the fixing part to form a rotary joint of the drive suspension. For example, the drive, together with the first suspension part, can be arranged relative to the fixing part in such a way that the openings of the first suspension part and of the fixing part are arranged along the axis of rotation of the rotary joint to be formed. A connecting means, for example a pin, a bolt, or a screw, can then be guided or arranged through the openings to form the rotary joint. This method step is preferably already carried out during manufacture at the factory. The second suspension part, which is connected to the fixing part, is also preferably already installed at the factory, so that a drive suspension unit is provided in the field in which a tilt is adjustable.

The method preferably further comprises the step of inserting the pre-installed drive suspension unit into the support element until an end position is reached and of subsequently fastening the drive suspension unit to the support element, for example by screws.

The method preferably comprises setting a tilt and aligning the drive relative to the support element by displacing the second suspension part relative to the fixing part. The displacement can be carried out by rotating an adjustment screw of the adjustment device. In particular, a tilt about the axis of rotation of the rotary joint is set. In preferred methods, the drive is installed on a guide rail as a support element.

Preferred embodiments can offer the advantage over the prior art that a drive can be installed on a support element, for example on a guide rail, in a space-saving manner. In particular, according to preferred embodiments, drive systems can be installed without superstructures on or above the guide rail or without a machinery room. Drive systems according to preferred embodiments can be installed in elevator shafts with low shaft heads. In particular, according to embodiments, drive systems can be equipped with particularly small or light drives. Preferred embodiments can also offer the advantage that a tilt of the drive with respect to the support element can be set. Skewing can be prevented or reduced in particular when a belt is used as the carrier means. The tilt can be readjusted over the lifetime of the elevator installation.

DESCRIPTION OF THE DRAWINGS

Various aspects of the invention are explained in more detail with reference to embodiments in conjunction with the drawings, in which.

DETAILED DESCRIPTION

Figure 1:
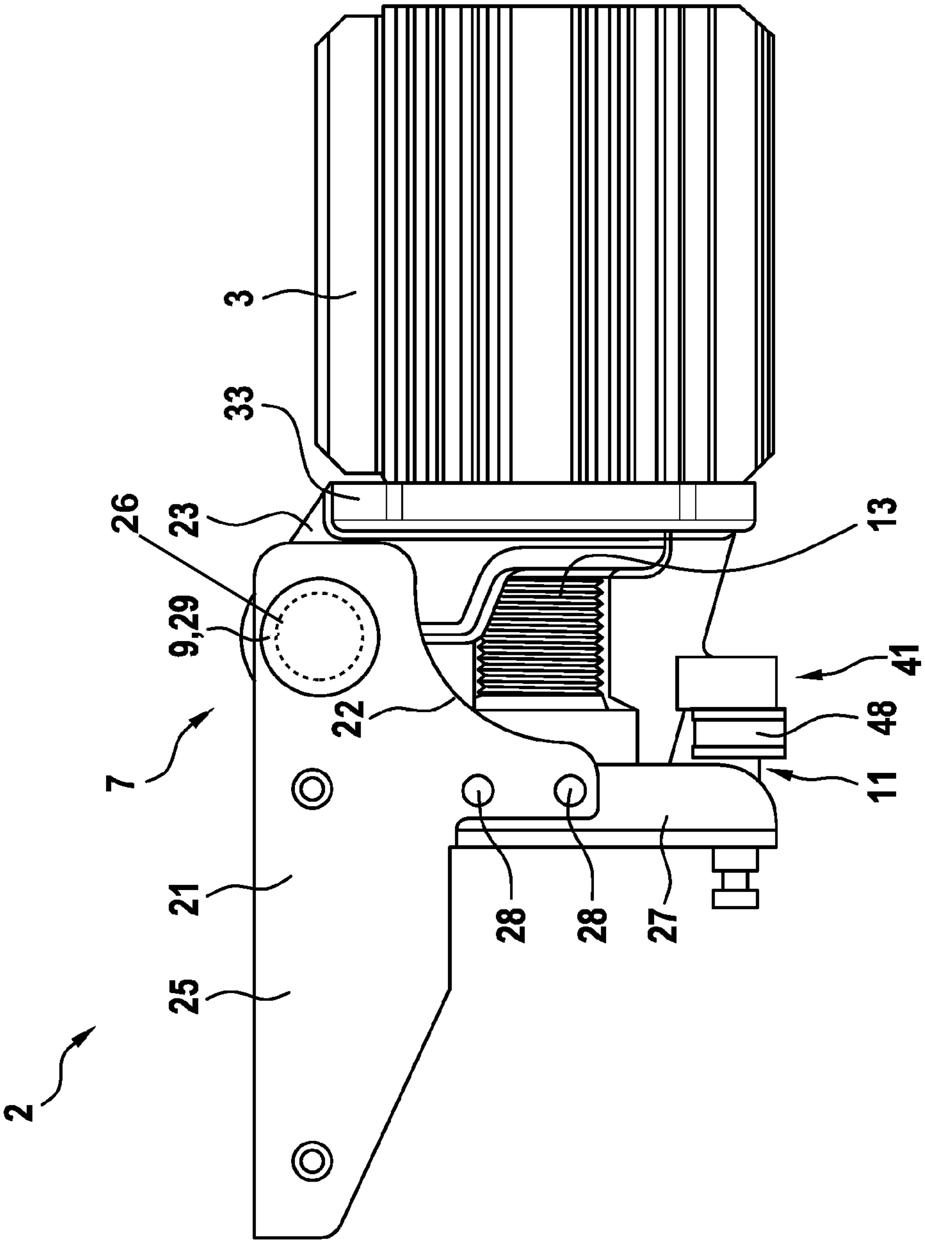
FIG. 1 shows a schematic view of a preferred embodiment of a drive/drive suspension unit.
Figure 2:
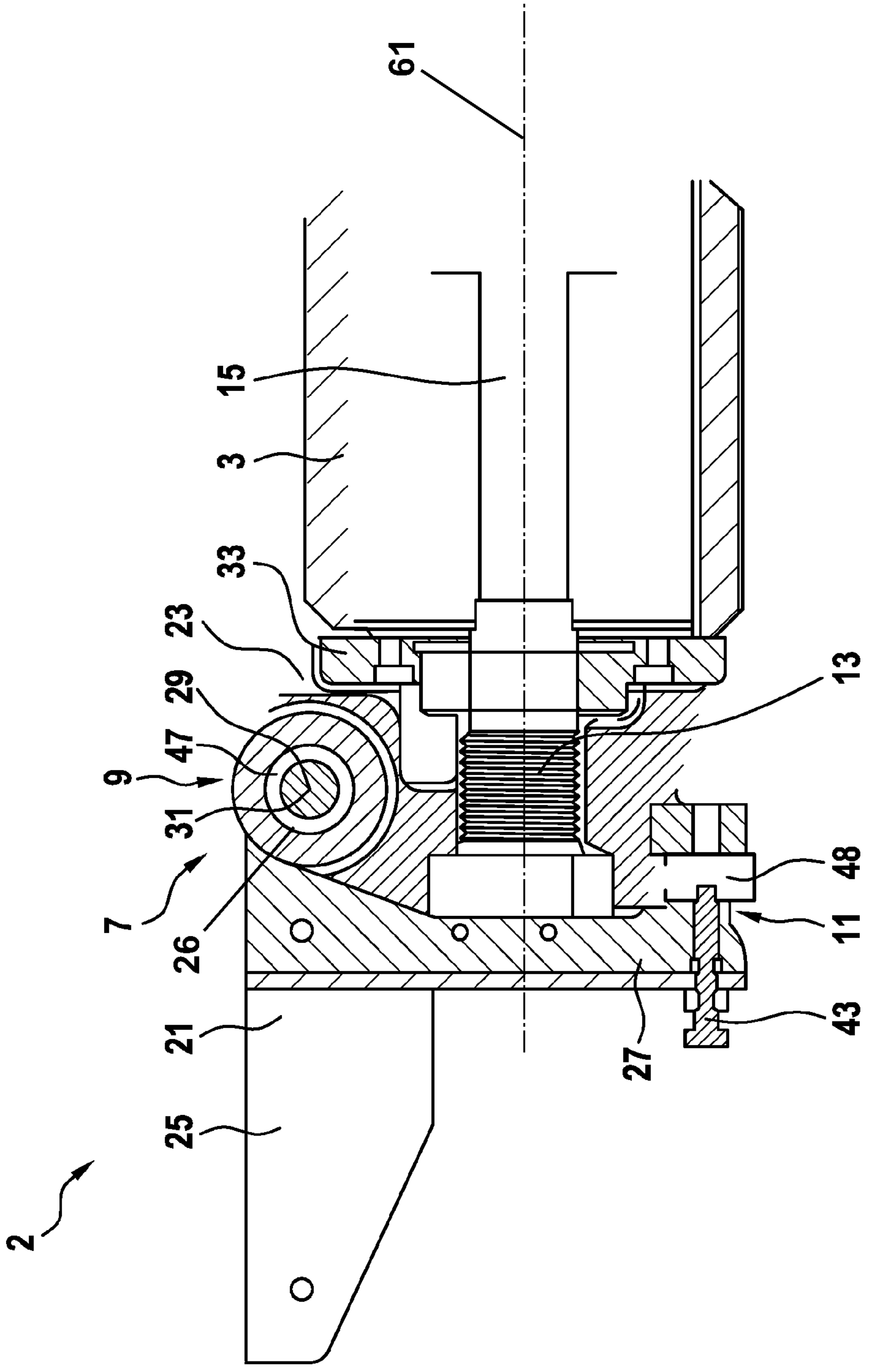
FIG. 2 shows a schematic sectional view of the embodiment shown in FIG. 1.

FIG. 1 shows a schematic view of a drive/drive suspension unit 2 according to a possible embodiment of the invention. The drive/drive suspension unit 2 comprises a drive 3 which is mounted via a drive suspension 7. FIG. 2 shows a schematic sectional view of the drive/drive suspension unit 2 from FIG. 1. The sectional view shows a section along a shaft axis 61 of a drive shaft 15 of the drive 3 parallel to a longitudinal axis of the guide rail (not shown, see FIG. 3). In FIGS. 1 and 2, the shaft axis 61 of the drive 3 is aligned at least substantially perpendicularly to the axis of rotation 31 of the rotary joint 9. In particular, the drive system 1 (not shown, see FIG. 3) is designed such that the shaft axis 61 runs at least substantially parallel to a drive-side side wall of an elevator car.

The drive suspension 7 comprises a rotary joint 9 for tiltably mounting the drive 3 on the support element 5. The rotary joint 9 comprises a fixing part 21 which can be fastened to the support element 5 (not shown, see FIG. 3). The fixing part 21 has an arc-like edge 22 which extends directly above the friction drive pulley 13. The rotary joint 9 also comprises a first suspension part 23 which is fastened to the drive 3. The first suspension part 23 is rigidly connected, in particular screwed, to the drive 3. In the embodiments shown, the first suspension part 23 has an opening 26 along the axis of rotation 31 of the rotary joint 9. As can be seen from FIGS. 1 and 2, the fixing part 21 has two openings along the axis of rotation 31 of the rotary joint 9. As shown for example in FIG. 2, the suspension part 23 extends between the two openings of the fixing part 21. The hinge-like interlocking of the fixing part 21 and the first suspension part 23 can, for example, increase the flexural rigidity of the rotary joint 9 with respect to torques perpendicular to the axis of rotation 31 of the rotary joint 9, in particular with respect to torques in the direction of the longitudinal axis of the support element 5 such as a guide rail. A connecting means 29 is arranged through the openings. In the embodiment shown, the connecting means 29 is designed as a bolt, in particular as a threaded bolt.

Figure 3:
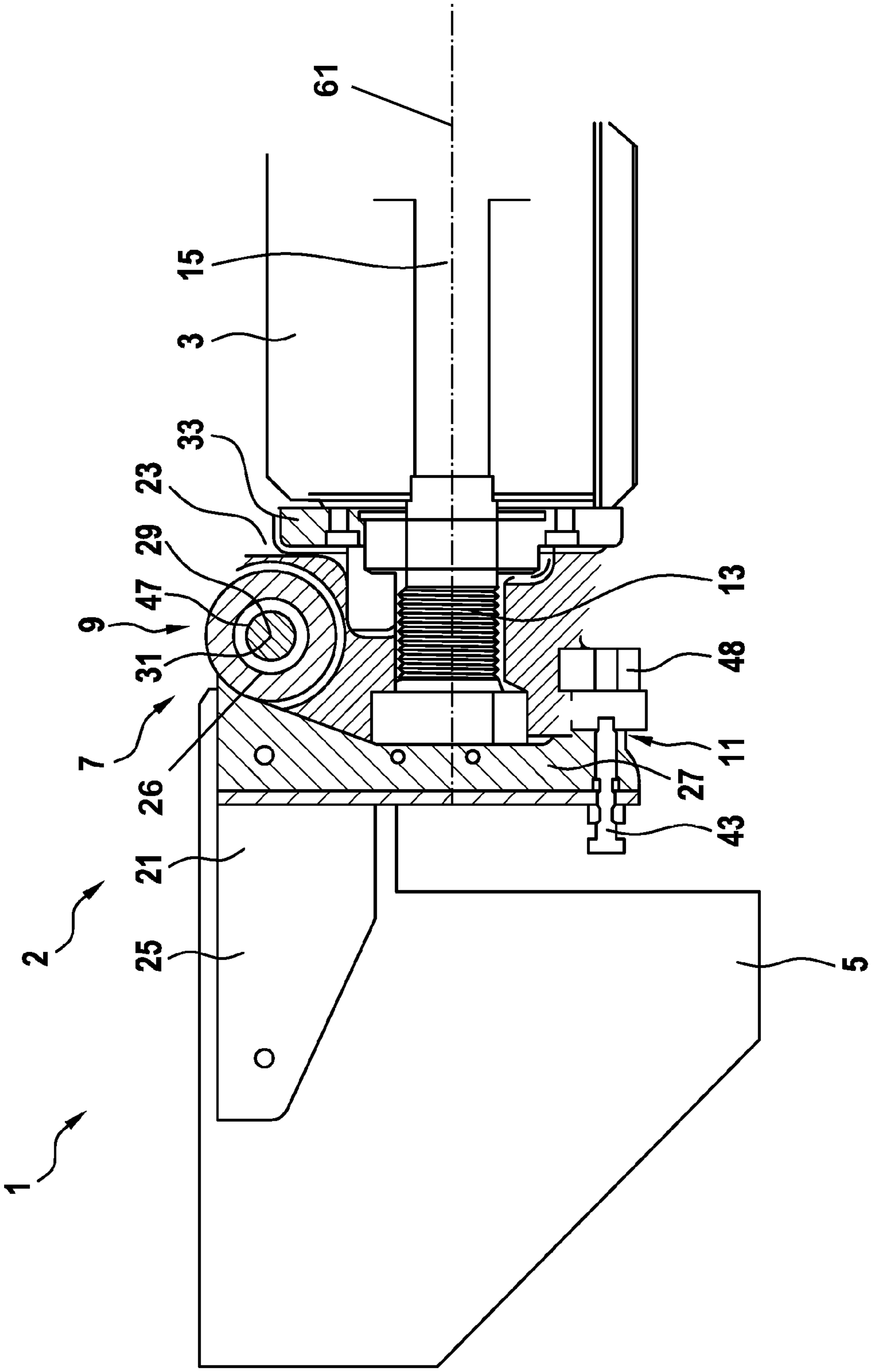
FIG. 3 shows a schematic view of a preferred embodiment of a drive system in which the drive/drive suspension unit shown in FIGS. 1 and 2 is installed.

The drive suspension 7 comprises an adjustment device 11. The adjustment device 11 extends between the fixing part 21 and a second suspension part 41. The second suspension part 41 can be linearly displaced relative to the fixing part 21. In the embodiment of FIGS. 1, 2 and 3, the second suspension part 41 can be displaced relative to the fixing part 21 by rotating an adjustment screw 43 of the adjustment device 11. By displacing the second suspension part 41 relative to the fixing part 21, a tilt of the drive 3 about the axis of rotation 31 of the rotary joint 9 relative to the support element 5 can be set or adjusted. In particular, a tilt of the drive shaft 15 and a friction drive pulley 13 arranged on the drive shaft 15 relative to the support element 5 can also be set. Setting the tilt of the friction drive pulley 13 can prevent or reduce skewing of the belt, for example when using a belt as a carrier means.

The fixing part 21 is designed in at least two parts and has at least one first sheet metal part 25 and at least one second sheet metal part 27, wherein the first sheet metal part 25 is designed for fastening to the first suspension part 23 and for fastening to the support element 5. The second sheet metal part 27 is designed for fastening to the second suspension part 41. The first sheet metal part 25 and the second sheet metal part 27 are preferably connected to one another by rivets 28, wherein the second sheet metal part 27 is preferably designed as a U-profile.

The drive suspension 7 of the embodiment shown comprises a second isolation element 48 which is arranged between the first suspension part 23 and the fixing part 21 and between the second suspension part 41 and the fixing part 21. In particular, a first isolation element 47 is arranged around the connecting means 29 in the region of the openings of the first suspension part 23 and of the fixing part 21. The isolation elements 47, 48 are designed to reduce, in particular to damp, the propagation of vibrations or structure-borne noise from the drive 3 to the support element 5 (see FIG. 3).

In the embodiment shown, the drive 3 is designed as a gearless electric motor. The drive suspension 7 comprises an adapter plate 33 which is fastened to the electric motor. The first suspension part 23 and the second suspension part 41 are fastened to the drive 3 via the adapter plate 33.

FIG. 3 shows a view of the embodiment of the drive/drive suspension unit 2 installed to form a drive system 1, wherein the drive/drive suspension unit 2 is inserted into the support element 5 and fastened thereto. In FIG. 3, the support element 5 is designed as a guide rail for guiding an elevator car, wherein a possibility for inserting the fixing part 21 of the drive suspension 7 is provided in the end region of the guide rail 5. The fixing part 21 is rigidly connected to the support element 5.

Figure 4:
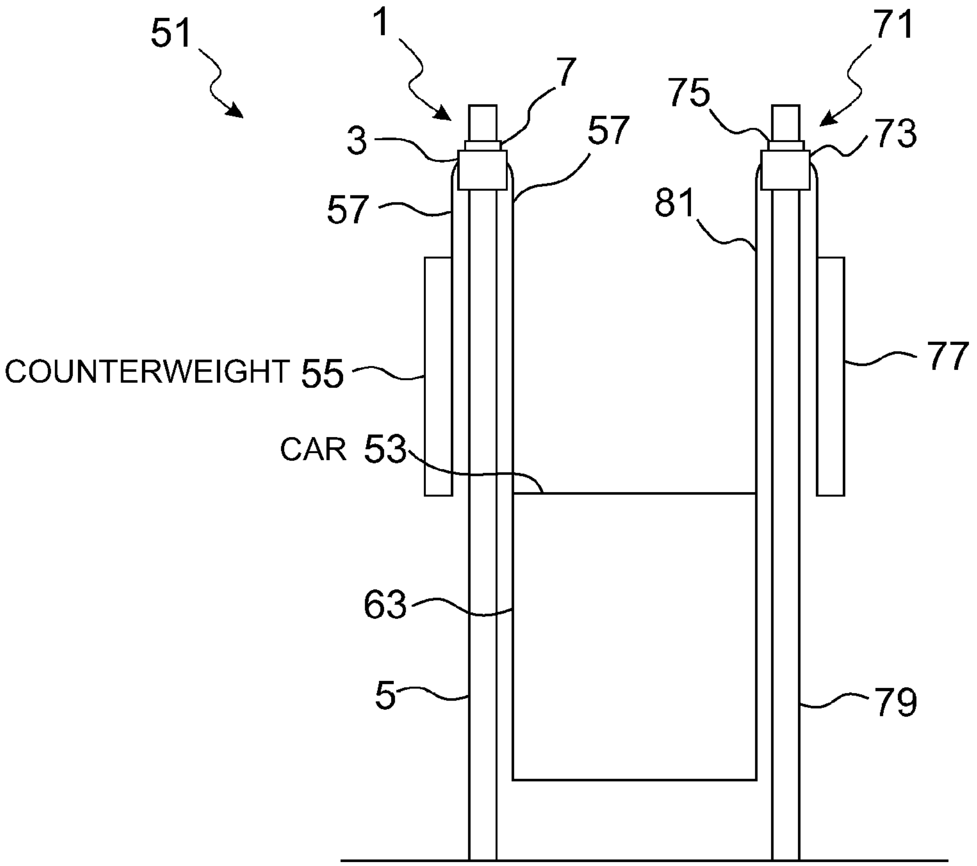
FIG. 4 shows a schematic view of a preferred embodiment of an elevator installation.
Figure 5:
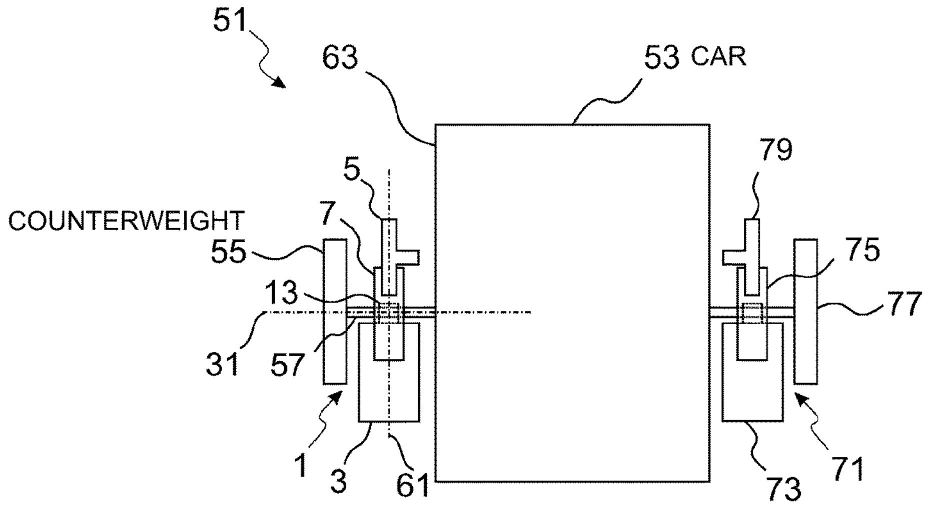
FIG. 5 shows a schematic plan view of an elevator installation according to preferred embodiments.

FIGS. 4 and 5 show an embodiment of an elevator installation 51. The elevator installation 51 comprises a drive system 1 according to the embodiments described herein comprising a drive 3 and a drive suspension 7 for fastening the drive 3 to a support element 5. A guide rail for guiding an elevator car 53 is provided as the support element 5 in FIGS. 4 and 5. The elevator car 53 is connected to a counterweight 55 via a carrier means 57. The carrier means 57, for example a belt, is guided over a friction drive pulley 13 of the drive 3. The drive 3 is designed to drive the carrier means 57 and to move the elevator car 53 and the counterweight 55 vertically.

In FIGS. 4 and 5, the drive 3 is arranged in an upper end region of the elevator installation 51. As shown by way of example in the plan view of the elevator installation 51 in FIG. 5, a shaft axis 61 of the drive 3 is aligned at least substantially parallel to a drive-side side wall 63 of the elevator car 53. The axis of rotation 31 of a rotary joint of the drive suspension 7 is oriented at least substantially perpendicularly to the shaft axis 61 and at least substantially perpendicularly to a vertical direction. The tilt of the shaft axis 61 with respect to a vertical direction or with respect to the longitudinal axis of the guide rail 5 is set, for example, so as to be at least substantially perpendicular.

The elevator installation 51 of FIGS. 4 and 5 has a further drive system 71 according to the embodiments of a drive system described herein. The further drive system 71 comprises a further drive 73 and a further drive suspension 75 for fastening the further drive 73 to a further support element 79, which is formed by a further guide rail in FIGS. 4 and 5. The further drive 73 is designed to drive a further carrier means 81 which is connected to the elevator car 53 and a further counterweight 77. The use of a further drive system can allow the use of smaller or lighter drives. In particular, the space requirement of a drive in a shaft head or a shaft pit can be reduced. In addition, smaller or lighter drives can be installed more easily.

Figure 6:
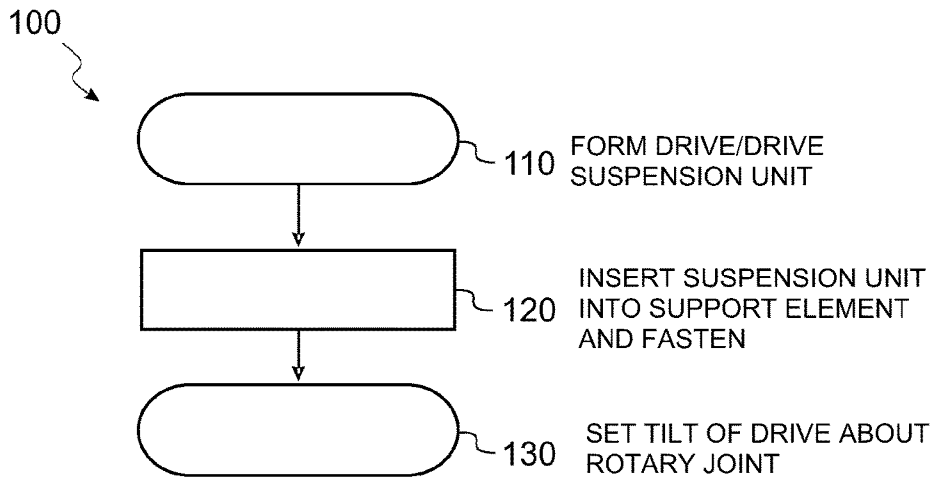
FIG. 6 shows a schematic representation of a preferred method for installing a drive on a support element of an elevator installation.

FIG. 6 shows a method 100 for mounting a drive on a support element of an elevator installation in an embodiment. At 110, the method 100 comprises pre-installation of the drive (3) and the drive suspension (7) to form a drive/drive suspension unit (2). A first suspension part and a second suspension part are fastened to the drive via an adapter plate. The drive is then positioned in such a way that a bolt is guided through openings of the first suspension part of the fixing part to form a hinge-like rotary joint. The bolt is fixed. The step can be carried out at the factory so that the fully pre-installed drive/drive suspension unit is available in the field.

After the pre-installation, the drive/drive suspension unit is inserted into the support element at 120 and, in an end position of the inserted state, the drive/drive suspension unit is fastened to the support element, for example by screwing.

At 130, a tilt of the drive about the rotary joint is set by rotating the adjustment screw. The tilt of the drive or the shaft axis of the drive is set in such a way that the shaft axis runs at least substantially perpendicularly to a vertical direction or such that a skewing of a belt is prevented or reduced.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A drive/drive suspension unit for an elevator installation, the drive/drive suspension unit comprising:

a drive;

a drive suspension for fastening the drive to a support element of the elevator installation;

wherein the drive suspension includes a rotary joint and an adjustment device, the rotary joint adapted to fasten the drive to the support element thereby enabling tiltably mounting the drive on the support element, and the adjustment device adapted to set a tilt of the drive about the rotary joint;

wherein the rotary joint includes a fixing part and a first suspension part, the fixing part adapted to fasten to the support element and the first suspension part being fastened to the drive;

wherein the fixing part and the first suspension part are rotatably connected to each other about an axis of rotation;

wherein the adjustment device includes a second suspension part fastened to the drive and connected to the fixing part;

wherein the fixing part and the second suspension part are displaceable linearly relative to one another to set the tilt;

wherein the fixing part includes a first sheet metal part and a second sheet metal part, the first sheet metal part being adapted to fasten to the first suspension part and to the support element, the second sheet metal part being adapted to fasten to the second suspension part, the first sheet metal part and the second sheet metal part being connected to one another by rivets, and the second sheet metal part being formed as a U-profile; and wherein the support element extends in a vertical direction and the drive/drive suspension unit, when in an installed state on the support element, has a shaft of the drive with a friction drive pulley arranged on the shaft, the shaft extending in a horizontal direction perpendicular to the vertical direction.

2. The drive/drive suspension unit according to claim 1 wherein the rotary joint is arranged above a horizontal shaft axis of the shaft, and wherein the adjustment device is arranged below the shaft axis.

3. The drive/drive suspension unit according to claim 1 wherein the fixed part has an arc-like edge extending directly above the friction drive pulley in the installed state.

4. The drive/drive suspension unit according to claim 1 wherein the support element includes a guide rail for guiding an elevator car.

5. The drive/drive suspension unit according to claim 1 wherein the fixed part is adapted to be partially inserted into the support element and then fastened to the support element in an end position of an inserted state.

6. The drive/drive suspension unit according to claim 1 wherein the first suspension part has a first opening and the fixing part has a second opening; and wherein the rotary joint includes a connecting element guided through the first opening and the second opening.

7. The drive/drive suspension unit according to claim 1 wherein the drive suspension includes a first isolation element that reduces or prevents a transmission of vibrations or structure-borne noise from the drive to the support element when the fixing part is fastened to the support element.

8. The drive/drive suspension unit according to claim 7 wherein the first isolation element is attached to the rotary joint.

9. The drive/drive suspension unit according to claim 7 wherein the drive suspension includes a second isolation element attached to the adjustment device.

10. An elevator installation comprising:

the drive/drive suspension unit according to claim 1;

an elevator car;

a counterweight connected to the elevator car via a carrier means; and wherein the drive of the drive/drive suspension unit drives the carrier means.

11. The elevator installation according to claim 10 including:

a further one of the drive/drive suspension unit wherein the drive/drive suspension units are arranged in an upper end region of the elevator installation;

wherein the carrier means is a belt;

wherein the elevator car has a drive-side side wall facing the drive/drive suspension unit; and wherein a shaft axis of the drive of the drive/drive suspension unit extends substantially parallel to the drive-side side wall.

12. A method for installing a drive on a support element of an elevator installation, the method comprising the steps of:

pre-installation of the drive and a drive suspension to form a drive/drive suspension unit according to claim 1;

inserting the drive/drive suspension unit into the support element until an end position of the drive/drive suspension unit is reached and subsequently fastening the drive/drive suspension unit to the support element in the end position; and setting a tilt of the drive about a rotary joint of the drive suspension.

13. A drive/drive suspension unit for an elevator installation, the drive/drive suspension unit comprising:

a drive;

a drive suspension for fastening the drive to a support element of the elevator installation;

wherein the drive suspension includes a rotary joint and an adjustment device, the rotary joint adapted to fasten the drive to the support element thereby enabling tiltably mounting the drive on the support element, and the adjustment device adapted to set a tilt of the drive about the rotary joint;

wherein the rotary joint includes a fixing part and a first suspension part, the fixing part adapted to fasten to the support element and the first suspension part being fastened to the drive;

wherein the fixing part and the first suspension part are rotatably connected to each other about an axis of rotation;

wherein the adjustment device includes a second suspension part fastened to the drive and connected to the fixing part;

wherein the fixing part and the second suspension part are displaceable linearly relative to one another to set the tilt;

wherein the fixing part includes a first sheet metal part and a second sheet metal part, the first sheet metal part being adapted to fasten to the first suspension part and to the support element, the second sheet metal part being adapted to fasten to the second suspension part, the first sheet metal part and the second sheet metal part being connected to one another by rivets, and the second sheet metal part being formed as a U-profile.

* * * * *